United States Patent
Aarre

(10) Patent No.: US 10,338,271 B2
(45) Date of Patent: Jul. 2, 2019

(54) RESERVOIR GRID CONVERSION FOR SCALING STRAIN

(75) Inventor: Victor Aarre, Stavanger (NO)

(73) Assignee: Schlumberger Technology Corporation, Sugar Land, TX (US)

(*) Notice: Subject to any disclaimer, the term of this patent is extended or adjusted under 35 U.S.C. 154(b) by 2089 days.

(21) Appl. No.: 12/963,906

(22) Filed: Dec. 9, 2010

(65) Prior Publication Data

US 2012/0150445 A1    Jun. 14, 2012

(51) Int. Cl.
| | |
|---|---|
| G06F 19/00 | (2018.01) |
| G01V 99/00 | (2009.01) |
| G01V 1/48 | (2006.01) |
| G01V 1/50 | (2006.01) |
| G01V 11/00 | (2006.01) |
| G01V 3/38 | (2006.01) |
| E21B 44/00 | (2006.01) |
| E21B 47/00 | (2012.01) |

(52) U.S. Cl.
CPC ............ *G01V 99/00* (2013.01); *G01V 1/48* (2013.01); *G01V 1/50* (2013.01); *E21B 44/00* (2013.01); *E21B 47/00* (2013.01); *G01V 3/38* (2013.01); *G01V 11/00* (2013.01)

(58) Field of Classification Search
CPC .......... G01V 3/083; G01V 3/12; G01V 11/00; G01V 11/002; G01V 3/28; G01V 3/38; G01V 3/20; G01V 3/30; G01V 5/101; G01V 1/52; G01V 1/50; E21B 44/00; E21B 47/022; E21B 47/00; G01N 2203/0075

USPC .................................................. 702/2, 6–11
See application file for complete search history.

(56) References Cited

U.S. PATENT DOCUMENTS

| | | | |
|---|---|---|---|
| 2003/0130796 A1* | 7/2003 | Wiggins | 702/14 |
| 2003/0179101 A1* | 9/2003 | Jenkins | E21B 47/16 340/854.4 |
| 2005/0087391 A1* | 4/2005 | Ounadjela | G01V 1/143 181/121 |
| 2005/0234690 A1* | 10/2005 | Mainguy et al. | 703/10 |
| 2006/0283589 A1* | 12/2006 | Sayers | 166/254.1 |
| 2010/0211365 A1* | 8/2010 | Jorgensen | 703/2 |

OTHER PUBLICATIONS

Jorgensen, "Ring-element analysis of layered orthotropic bodies", Computer Methods in Applied Mechanics and Engineering, 102 (1993) 319-336 (18 pages).
Komatitsch et al., "Tensorial formulation of the wave equation for modeling curved interfaces", Geophys., J. Int. (1996) 127, 156-168 (13 pages).
Office Action for the equivalent Norwegian patent application 20111686 dated Jan. 2, 2018.

* cited by examiner

*Primary Examiner* — Sujoy K Kundu
*Assistant Examiner* — L. Anderson

(57) ABSTRACT

One or more computer-readable media include computer-executable instructions to instruct a computing system to, for a given time, solve the elastic wave equation in tensorial form for a geological reservoir model subject to stated conditions; and adjust a grid associated with the geological reservoir model based on solution of the elastic wave equation in tensorial form for the given time. Various other apparatuses, systems, methods, etc., are also disclosed.

15 Claims, 8 Drawing Sheets

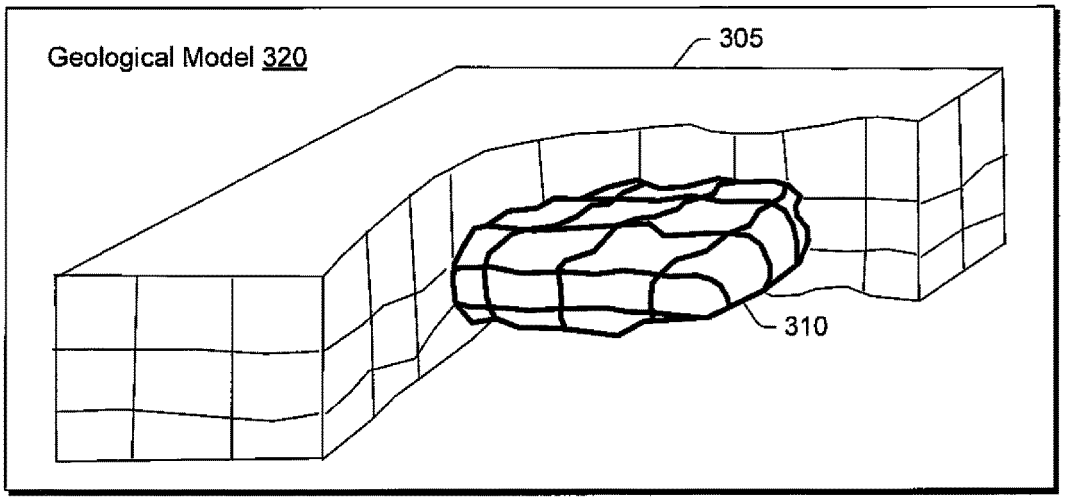
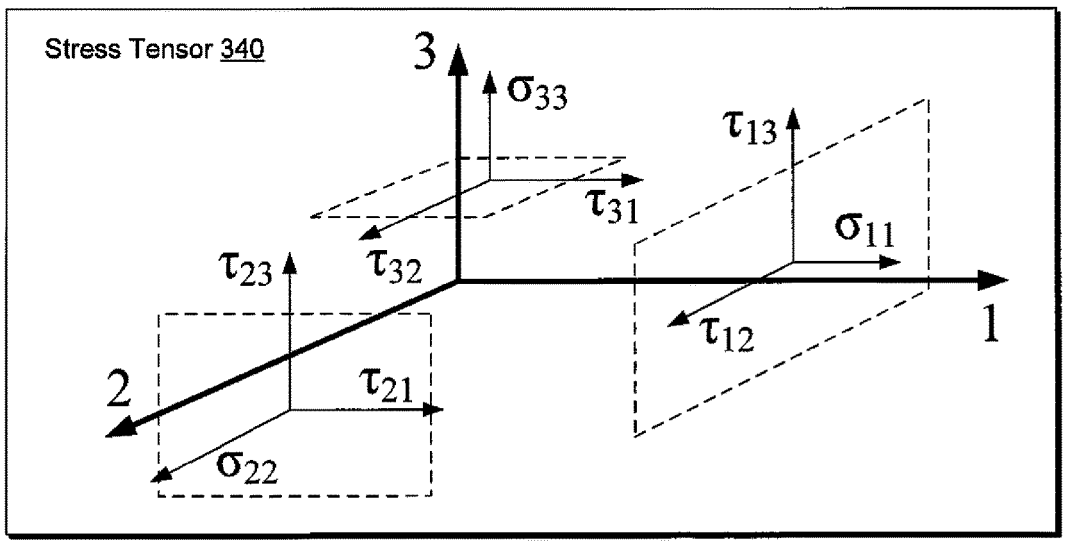
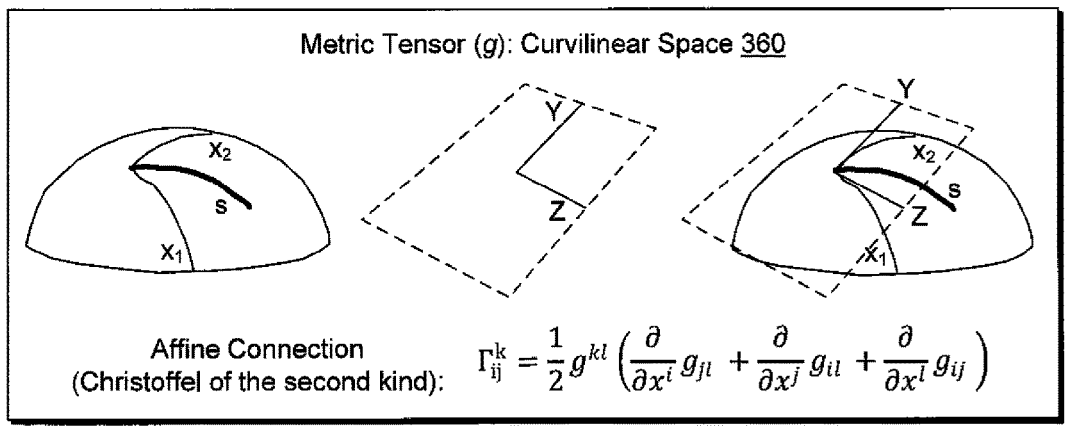
Fig. 3

Tensorial Form of Elastic Wave Equation 410

$$\rho \frac{\partial^2 \vec{u}}{\partial t^2} = \nabla_\Gamma \sigma + \vec{f}(t) \quad \begin{array}{l} \sigma = \Lambda(\epsilon) \\ \epsilon = \mathcal{L}\vec{u}(g) \end{array}$$

Solve for Displacement $u$
using the Tensorial Form of the Elastic Wave Equation
(i.e., in curvilinear space)

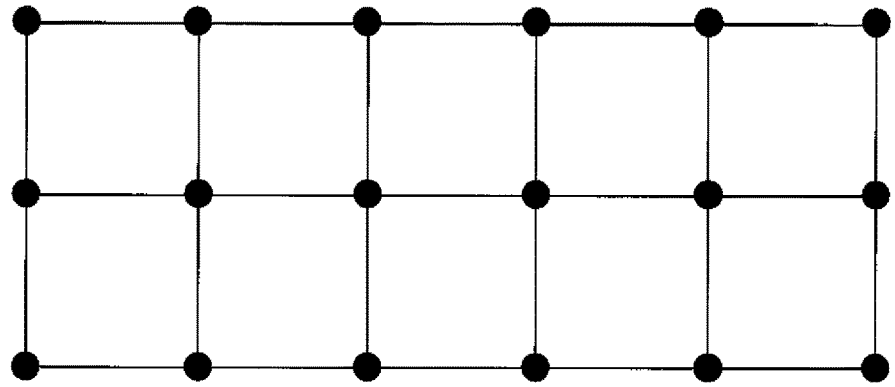

Regular Grid 420
(limited representation of strain)

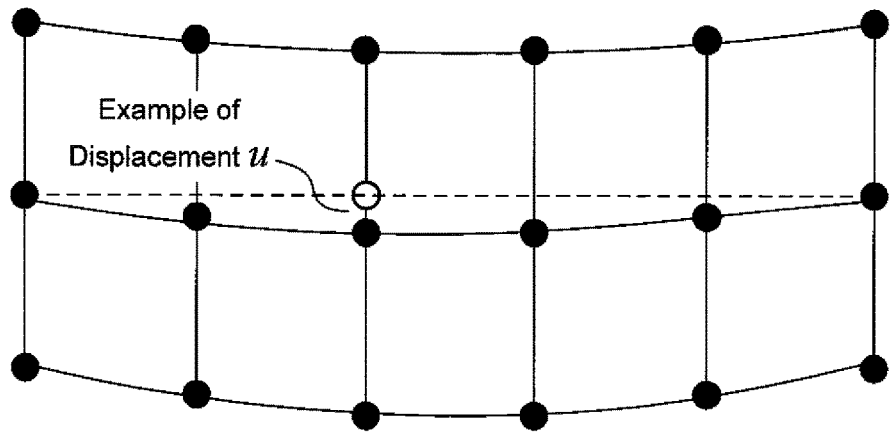

Adjusted Grid Based on Displacement from Solution of
Elastic Wave Equation in Tensorial Form 430

Example of Displacement $u$

Fig. 4

Elastic Wave Equation:

$$\rho \frac{\partial^2 \vec{u}}{\partial t^2} = \nabla_\Gamma(\Lambda(\mathcal{L}\vec{u}(g))) + \omega(t)g^*$$

Stiffness Tensor $\Lambda(\mathcal{L}\vec{u}(g))$

Gradient force or differential force $\nabla_\Gamma(\Lambda(\mathcal{L}\vec{u}(g)))$ Applied, external force $\omega(t)g^*$ Metric Tensor $g \sim T_2^0 = g_{ij} \cdot x^i \times x^j$ Dual Metric Tensor $g^* \sim T_0^2 = g^*{}_{ij} \cdot x_i \times x_j$ Hooke's law $\vec{\Lambda} \sim T_0^4 = c^{ijkl} \cdot x_i \times x_j \times x_k \times x_l$ Displacement $u \sim T_0^2 = u^i \cdot x_i$ Strain $\epsilon \in T_2^0 = \epsilon_{ij} \cdot x^i \times x^j$ Lie Derivative (strain)

$$\mathcal{L}\vec{u}(g) = [u^m \frac{\partial}{\partial x^m}(g_{ij}) + g_{kj}\frac{\partial}{\partial x^i}(u^k) + g_{il}\frac{\partial}{\partial x^j}(u^l)] \cdot x^i \times x^j$$

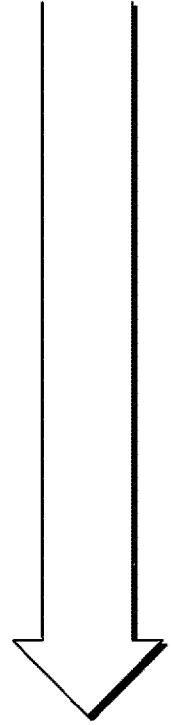

Provide Tensorial Form of Elastic Wave Equation
510

Fig. 5

Finite Difference Method in Time 610

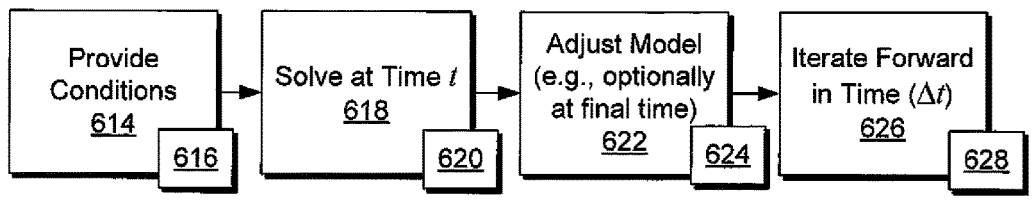

$u_0 = \mathcal{O}_0^1 = u_0^i \cdot x_i$  Initial or Prior Displacement $u_1 = \mathcal{O}_0^1 = u_1^i \cdot x_i$  Current Displacement $q = \mathcal{O}_0^1 = q^i \cdot x_i$  Temporary Displacement $\epsilon = \mathcal{O}_2^0 = \epsilon_{ij} \cdot x^i \times x^j$  Strain $\sigma = \mathcal{O}_2^0 = \sigma^{ij} \cdot x^i \times x^j$  Stress $a = \mathcal{O}_0^1 = a^i \cdot x_i$  Acceleration For i = 0 to n-1

$\vec{\epsilon} = \mathcal{L}\vec{u}(\vec{g})$ Strain (Lie derivative)

$\vec{\sigma} = \Lambda(\vec{\epsilon}) + \vec{g}^* \cdot \omega(i\Delta t)$ Stress $\vec{a} = \frac{\nabla_\Gamma \vec{\sigma}}{\rho}$ where $a = \frac{\partial^2 \vec{u}}{\partial t^2}$ where $\Gamma$ is needed for gradient $\vec{q} = 2\vec{u}_1 - \vec{u}_0 + \Delta t^2 \vec{a}$ $\vec{u}_0 = \vec{u}_1$ $\vec{u}_1 = \vec{q}$ end Return: $\vec{u}_1$ final displacement

Fig. 6

RESERVOIR GRID CONVERSION FOR SCALING STRAIN

BACKGROUND

Conventional approaches to geological reservoir modeling rely on three-dimensional Cartesian grids that can be iterated over time (e.g., to provide a four-dimensional model). A reservoir may span hundreds of square kilometers and be located kilometers in depth. The expansive nature of a typical oil reservoir brings various types of physical phenomena into play. Such phenomena may exhibit macroscale, microscale or a combination of macro- and microscale behavior. However, attempts to capture microscale phenomena via increased grid density or grid densities causes an increase in computational and other resource requirements. For example, increasing two-dimensional grid density by decreasing grid spacing from 10 meters by 10 meters to 5 meters by 5 meters will increase computational requirements significantly (e.g., a four-fold increase). Accordingly, most conventional models sacrifice microscale accuracy to maintain reasonable resource requirements. Various techniques described herein can allow for more accurate modeling of microscale phenomena (e.g., one meter resolution or less) without necessarily increasing grid density.

SUMMARY

One or more computer-readable media include computer-executable instructions to instruct a computing system to, for a given time, solve the elastic wave equation in tensorial form for a geological reservoir model subject to stated conditions; and adjust a grid associated with the geological reservoir model based on solution of the elastic wave equation in tensorial form for the given time. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 3 illustrates an example geological model, stress tensor and metric tensor;

FIG. 4 illustrate an example formulation of the elastic wave equation, a grid and an adjusted grid;

FIG. 5 illustrates an example formulation of the elastic wave equation;

FIG. 6 illustrates an example finite difference technique for iteration in time;

DETAILED DESCRIPTION

Figure 1:
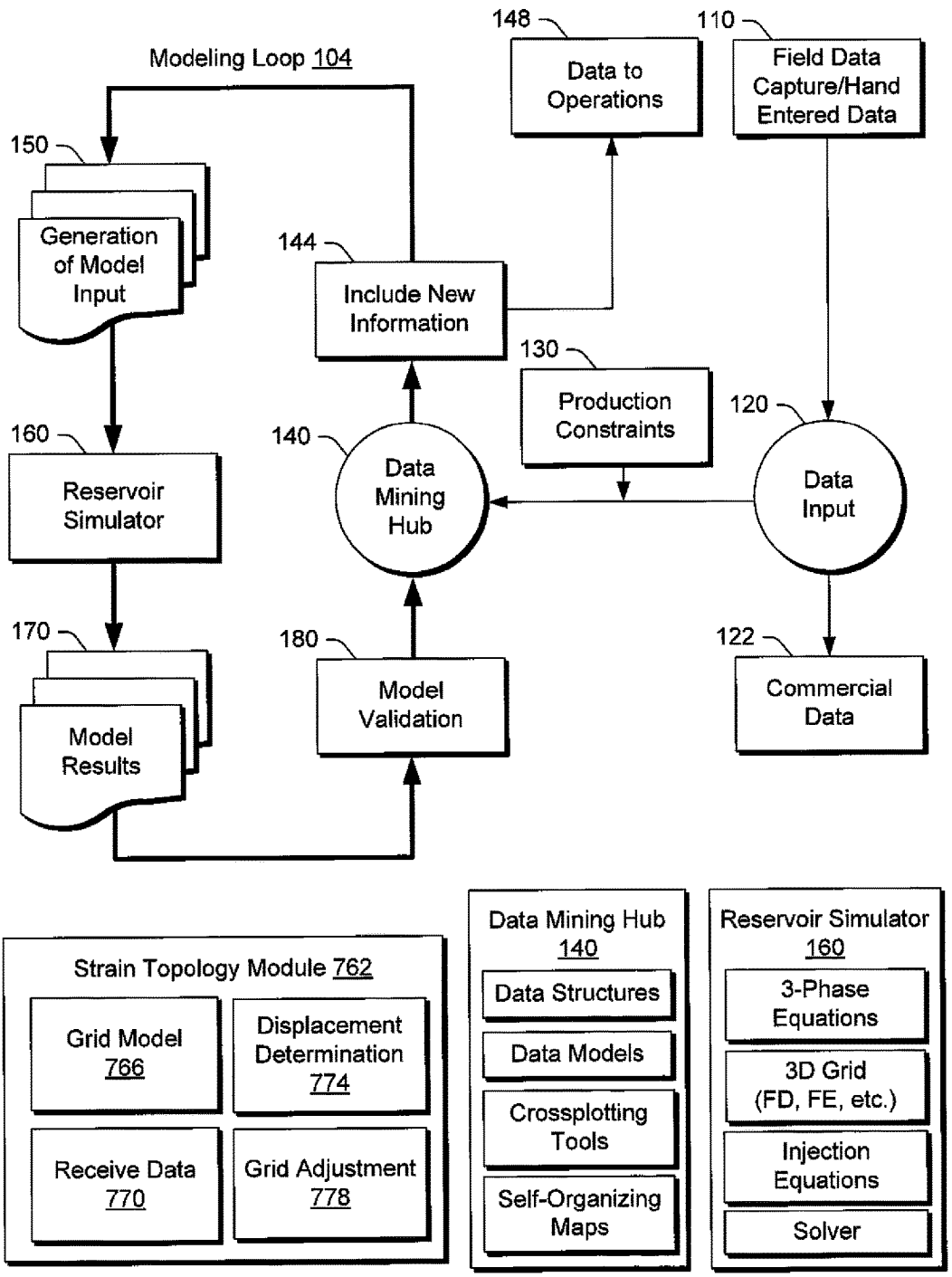
FIG. 1 illustrates an example modeling system that includes a reservoir simulator, a data mining hub and a strain topology module.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As described herein, a geological volume can be represented by a tensorial formulation of the elastic wave equation. Such a geological volume can include a reservoir and additional geology such as overburden.

With respect to modeling elastic wave equations, forward modeling of seismic wave propagation of a producing reservoir provides for enhanced understanding of seismic response. Such modeling can generate realistic test data that can be used, in turn, as input to various algorithms developed to infer information about these reservoirs, especially how they may change over time.

A number of different physical changes can happen to producing reservoirs over time. For seismic experiments, changes in stress and strain are quite relevant including changes above, below and to the sides of a reservoir. Changes in stress alter anisotropic wave velocities, which has implications for both traveltime and amplitude of seismic waves in a medium; whereas, changes in strain alter shape of a medium. Field data prove that some producing reservoirs experience deformations due to changes in, for example, pore pressures. The relationship between deformation and pore pressure can be demonstrated via geomechanical modeling.

As described herein, the nature of deformation and the cause of deformation can be relevant. For example, where deformation occurs in a certain manner due to underlying physical phenomenon or phenomena, this knowledge can be relied on to select a region or regions for transformation to a curvilinear space. As discussed below, deformation can occur and manifest as subsidence or compaction in and around a reservoir interval, sometimes leading to changes measurable on an overlying surface (e.g., seabed surface). In a production environment, or even an exploration environment, bores and equipment may be impacted by stress, strain or stress and strain. Accordingly, an ability to model, understand and respond to changes in stress, strain or stress and strain can be quite relevant and possibly accompanied by significant economical ramifications.

With respect to elastic wave modeling, even small strain changes (on the scale of centimeters of vertical thickness change) can have a measureable impact on the traveltime (and sometimes amplitude) of seismic waves propagating through a reservoir. Small stress changes can also have an impact on seismic wave propagation. Further, it can be demonstrated analytically that stress and strain changes will lead to different seismic responses. For a reservoir, stress and strain changes often happen simultaneously.

As described herein, it can be desirable to separate effects of stress from effects of strain when conducting a 4D (time-lapse) seismic survey over a producing reservoir. Conventional approaches often ignore changes in strain and quantitatively invert for apparent stress only. The assumption that changes in strain are either infinitesimal or do not exist for production reservoirs is often erroneous. Accordingly, in various examples described herein, it is assumed that changes in strain may occur and that changes in strain may be obtained via a simultaneous stress/strain inversion to estimate both stress and strain.

A particular approach to 4D simultaneous strain/stress inversion includes providing reliable test data, which properly represent the seismic response of a producing reservoir under (i) known initial conditions and (ii) known time-variant conditions. In actual reservoirs, relevant strain changes can be on the scale of centimeters of vertical thickness. As described herein, a reservoir (e.g., with overburden) model should be able to represent details of such a scale.

Two types of models are used commonly in reservoir modeling: layer models and gridded models. Layer models build 3D models by explicitly storing the correct position and any strain of such position for all layer interfaces in the model. In contrast, gridded models store for each point with a regular distance (referred to as the "grid size") from origo, corresponding elastic properties. A gridded model can be illustrated as a collection of 3D cubes where each cube stores its corresponding elastic properties.

Layer models tend to be quite suitable for ray-trace modeling yet unsuitable for finite difference modeling. On the other hand, gridded models tend to be suitable for both ray-tracing and finite difference modeling. Layer models tend to be suitable to accurately represent both small stress changes and small strain changes. Gridded models are able to represent small stress changes and typically only large (i.e. much bigger than the grid size) strain changes.

In general, ray-tracing is not a very accurate way of modeling seismic response of a reservoir, as ray-tracing is mainly able to model traveltime and amplitude of primary reflections/transmissions of high frequencies only (ray-tracing can be said to be a high-frequency approximation to finite difference modeling). Hence, ray-tracing does not generally provide for acceptable modeling of wave multiples, wave interference, wave mode conversions and other complex (non-primary) wave propagations.

In contrast, finite difference modeling can be quite accurate but more expensive as to computational requirements when compared to ray-tracing (e.g., with respect to memory requirements and run-time). As mentioned, computational requirements such as run-time and memory depend heavily of model grid size. And, to represent small strain changes, grid size needs to be quite small, which may lead to prohibitively expensive modeling experiments. For such reasons, small strain changes are not usually accounted for by conventional 4D finite difference seismic modeling. As described herein, small strain changes can be modeled as being related to realistic and important reservoir scenarios.

Most often finite difference modeling of seismic waves relies on a grid with fixed cell sizes defined in a Cartesian coordinate space. In geo-mechanical modeling, stain information is often obtained in the overburden indicative of strain much smaller than the geo-mechanical model's cell size. As the strain is less than the cell size, it is not possible to include these strains in such a conventional modeling approach. While overburden is mentioned, similar issues exist for the underlying reservoir. Specifically, in a conventional approach, one would need to snap layer boundaries to a nearest cell, which introduces error (i.e., adjustment from snapping can exceed actual displacement).

As described herein, an approach can include performing an initial (baseline) finite difference modeling on a regular grid in a Cartesian coordinate space followed by updating the initial model with changed stresses (e.g., due to production operations) and incorporating the associated strains (e.g., displacements), in and around the reservoir, as a deformation of the metric space. In other words, this approach can perform the finite difference modeling in a curved space, where the curvature of the model space is proportional to the strain the reservoir has experienced. This can be accomplished by incorporating, explicitly, the curvature of the space in a model. While the model can still be represented as a "gridded" model (e.g., a set of property cubes), it is formulated to calculate the curvature attributes by incorporating the curvature properties in the model. Ultimately, the finite difference modeling can be performed in a manner that honors curvature (e.g., curvature that can more accurately represent strain-related deformation such as exhibited in practice).

Finite difference seismic wave modeling in curved space has been performed for purposes of modeling of earthquakes that propagate energy all around the globe. Such finite difference seismic wave models are not usually anisotropic. Further, such seismic wave models have large grid spacing to encompass the entire Earth. Yet further, such seismic wave models rely on curved space specifically to explicitly match and honor curvature of the Earth.

As described herein, by introducing curvilinear space formulations (e.g., tensorial form), various approaches can account for physical phenomena that have proven to lead to curvilinear changes in shape (e.g., consider a surface depression caused by settling or compaction of underlying ground). Further, a modeling approach that includes representation of the elastic wave equation in curvilinear space can readily account for anisotropy. A particular modeling approach converts reservoir strains into a gridded model in a curved space and then performs finite difference modeling in the curved space. Such a modeling approach can thereby account for production-induced strains.

As described herein, the elastic wave equation may be formulated using the metric tensor. In general, such a tensorial approach can be implemented independent of a model's coordinate system. Specifically, the tensorial approach introduces curvature properties whose values can be determined. Accordingly, a model defined by a grid in a Cartesian coordinate system can be reformulated using, for example, the metric tensor to introduce curvature properties. As described herein, the curvature properties can be solved to provide information as to strain.

As described herein, finite difference seismic wave modeling may be performed directly on a geological grid such as a corner-point grid. A corner-point grid is generally not Cartesian (e.g., does not necessarily have orthogonal axes with unit distance in every dimension). While it is not possible to perform finite difference seismic wave modeling directly on such a geological grid, it is possible to "bend" (e.g., transform) the curved grid into a Cartesian grid and then store the bending information (or deformation information) as curvature properties in a metric tensor form. In such an example, it is possible to then perform finite difference seismic wave modeling in the curved space that honors the metric tensor. Accordingly, such an approach can model seismic wave propagation through an irregular grid.

The elastic wave equation formulated using the metric tensor is an elastic partial differential equation (PDE). Such a PDE aims to model properly wave propagation (e.g., traveltime and amplitude) of both acoustic and shear waves; noting that such an approach applies the full Hooke's tensor. Accordingly, arbitrary anisotropy (VTI, HTI, azimuthal, polar, etc.) can be honored via this modeling approach (e.g., if the appropriate parameters are known). As described herein, the metric tensor approach can also support dispersion modeling where Hooke's tensor is frequency-dependent. As to dispersion, an approach may model each frequency separately or perform the modeling in a frequency domain.

FIG. 1 shows an integrated reservoir simulation and data hub system 100. The system 100 includes a modeling loop 104 composed of various modules configured to receive and generate information. In a typical operational process, the system 100 receives, at a field data block 110, field data about a reservoir, which may be captured electronically via one or more data acquisition techniques, gathered "by hand" through observation or reporting, etc. The field data block 110 transmits the received data to a data input 120 configured to input data to the modeling loop 104. The data input 120 may also provide some of the received field data to a commercial data block 122 (e.g., for any of a variety of commercial purposes such as financial modeling).

The system 100 includes a production constraints block 130, which may provide information, for example, related to production equipment (e.g., pumps, piping, operational energy costs, etc.). The modeling loop 104 receives information via a data mining hub 140. As noted this information can include data from the data input 120 as well as information from the production constraints block 130. The data mining hub 140 may rely at least in part on a commercially available package or set of modules that execute on one or more computing devices. For example, a commercially available package marketed as the DECIDE!® oil and gas workflow automation, data mining and analysis software (Schlumberger Limited, Houston, Tex.) may be used to provide at least some of the functionality of the data mining hub 140.

The DECIDE!® software provides for data mining and data analysis (e.g., statistical techniques, neural networks, etc.). A particular feature of the DECIDE! software, referred to as Self-Organizing Maps (SOM), can assist in model development, for example, to enhance reservoir simulation efforts. The DECIDE!® software further includes monitoring and surveillance features that, for example, can assist with data conditioning, well performance and underperformance, liquid loading detection, drawdown detection and well downtime detection. Yet further, the DECIDE! software includes various graphical user interface modules that allow for presentation of results (e.g., graphs and alarms). While a particular commercial software product is mentioned with respect to various data hub features, as discussed herein, a system need not include all such features to implement various techniques. Further, while various features of the data mining hub 140 are shown in FIG. 1 (data structures, crossplotting tools, data models, and SOMs), such features may be optional.

Referring again to the modeling loop 104 of FIG. 1, the data mining hub 140 acts to include new information per block 144; noting that some or all of such data may be transmitted to a data to operations block 148 (e.g., for use in the field, etc.). The loop 104 relies on the new information of block 144 to generate model input in a generation block 150. For example, the generation block 150 may adjust one or more parameters of a mathematical model of a reservoir (e.g., optionally including additional geological structure) based at least in part on the new information. In the system 100, the model input is received by a reservoir simulator 160. The reservoir simulator 160 may rely at least in part on a commercially available package or set of modules that execute on one or more computing devices. For example, a commercially available package marketed as the ECLIPSE® reservoir engineering software (Schlumberger Limited, Houston, Tex.) may be used to provide at least some of the functionality of the reservoir simulator 160.

The ECLIPSE® software relies on a finite difference technique, which is a numerical technique that discretizes a physical space into blocks defined by a multidimensional grid. Numerical techniques (e.g., finite difference, finite element, etc.) typically use transforms or mappings to map a physical space to a computational or model space, for example, to facilitate computing. Numerical techniques may include equations for heat transfer, mass transfer, phase change, etc. Some techniques rely on overlaid or staggered grids or blocks to describe variables, which may be interrelated. While the finite difference is mentioned, a finite element approach may include a finite difference approach for time (e.g., to iterate forward or backward in time). As shown in FIG. 1, the reservoir simulator 160 includes equations to describe 3-phase behavior (e.g., liquid, gas, gas in solution), injection equations to model injection techniques, a 3D grid feature to discretize a physical space and a solver to solve reservoir models.

As shown in FIG. 1, the reservoir simulator 160 provides results 170 based on a reservoir model. Per a validation block 180, the results 170 may be validated, for example, by comparison to acquired physical data for the reservoir. The loop 104 may continue iteratively as new data is introduced via the data mining hub 140.

FIG. 1 also shows a strain topology module 762. Aspects of such a module are described in more detail below and, particularly, with reference to FIG. 7. In the example of FIG. 1, the strain topology module 762 includes a grid model module 766, a data reception module 770, a displacement determination module 774 and a grid adjustment module 778 that can adjust a grid based on displacement (e.g., strain). As described herein, the elastic wave equation can be provided in a tensorial form. In tensorial form, the elastic wave equation provides for measures of curvature. During material production from a reservoir, which may include injection, changes may occur that manifest geologically with curvature, for example, due to settling or expansion of geological structures. As described herein, the strain topology module 762 may be used for prediction, control, history matching, etc.

Figure 2:
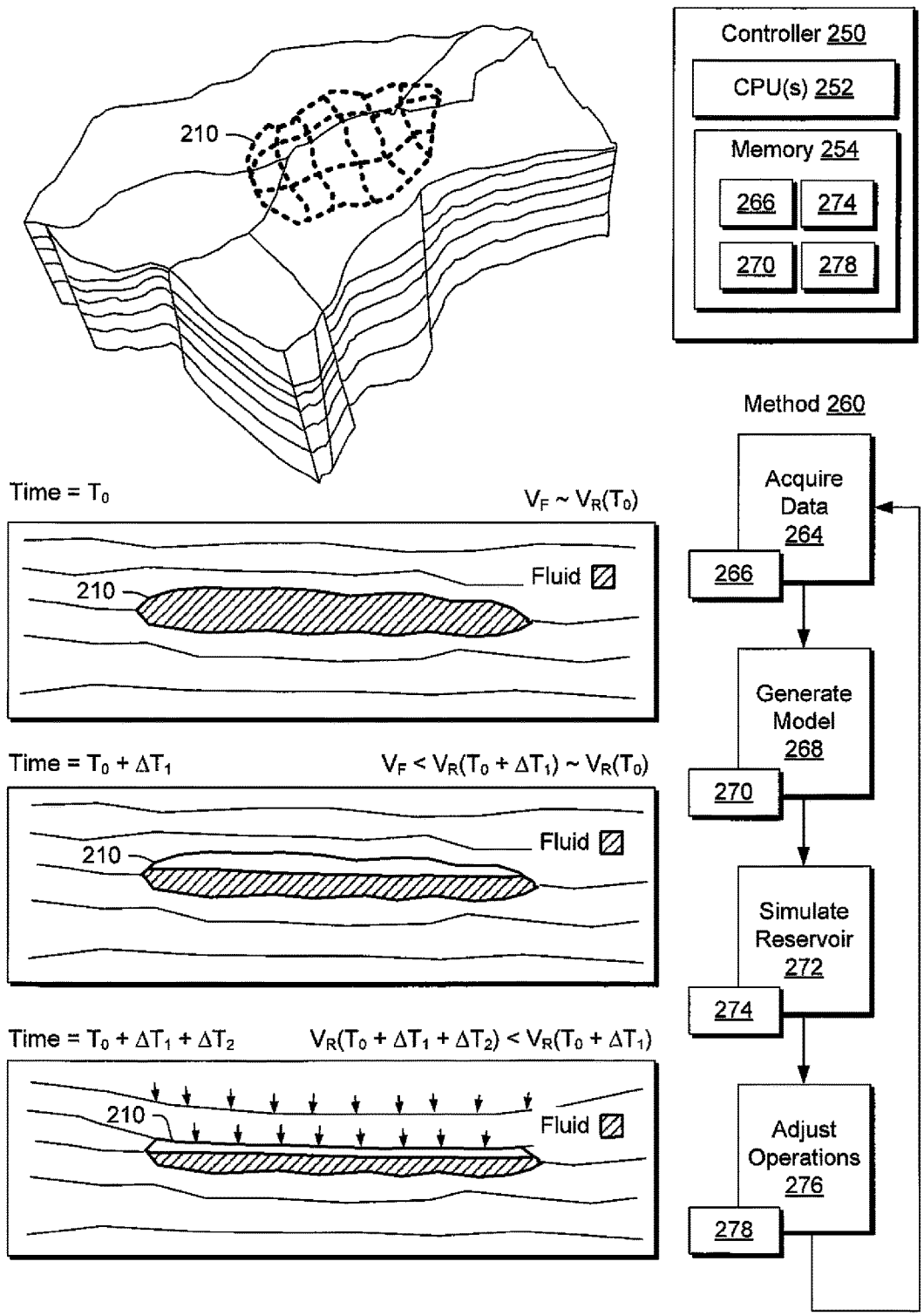
FIG. 2 illustrates an example controller and method to simulate a reservoir and adjust operations.

FIG. 2 shows an example of a production scenario over time with respect to a reservoir 210. At time $T_0$, the reservoir is shown as being full of fluid and the volume of the fluid $V_F$ being approximately equal to the volume of the reservoir $V_R$ (e.g., for simplicity, assuming that the fluid is not in a porous matrix). During production, fluid is extracted from the reservoir such that at a subsequent time, the volume of the fluid is less than the volume of the reservoir. In the example of FIG. 2, a void is shown to represent the difference in these volumes. Where the fluid extracted had acted to provide support to geological structure, the absence of the fluid support changes the force balance and, as shown, at a later time, the reservoir experiences some deformation. For example, an upper surface of the reservoir may collapse due to stress.

In general, for fluid in a porous matrix, the geological process may be more accurately represented as one of stress and strain. Specifically, as fluid is extracted from the interstitial spaces of the porous matrix, the force balance changes and the stress causes the matrix to experience strain. Strain, whether compaction or expansion, is related inherently to displacement. Displacement of material at one level can cause displacement at other levels. As described herein, the stress/strain balance at a given point in time may manifest as physical changes with some degree of curvature. As described herein, fluid may be liquid, gas or a combination of liquid and gas. For example, fluid saturation may be gas saturation or liquid saturation. Fluid saturation may include both gas saturation and liquid saturation. Accordingly, a module may include instructions to determine gas saturation and liquid saturation.

FIG. 2 also shows an example of a controller 250 and an associated method 260. The method 260 includes an acquisition block 264 for acquiring data, a generation block 268 for generating a model, a simulation block 272 for simulating reservoir changes and an adjustment block 276 for adjusting one or more operations related to the reservoir. The adjustment block 276 may adjust a process related to injection or extraction of material, adjust a data acquisition process, adjust a downstream process for processing of extracted material, adjust an upstream process for processing of material to be injected, etc. Such adjustments may be made via electronic communications (e.g., instructions, signals, etc.) or by manual operations (e.g., observation of simulation results and manual adjustment of a process). Such adjustments may be optionally incorporated in one or more of the blocks of the system 100 of FIG. 1.

In the example of FIG. 2, the controller 250 includes one or more CPUs 252 (e.g., one or more cores) and memory 254. As shown, the memory 254 stores instruction modules 266, 270, 274 and 278 that correspond to the various blocks 264, 268, 272 and 276 of the method 260, respectively.

FIG. 3 shows a geological model 320, the stress tensor 340 and the metric tensor 360 as representing a curvilinear space. The model 320 shows a geological volume 305 as including a reservoir 310. As mentioned, the model 320 may be represented by a grid. The stresses in the geological volume 305 can be represented by the Cauchy stress tensor 340. The Cauchy stress tensor 340 can model stress at any point in an object, assumed to be a continuum, by its nine components. The Cauchy stress tensor is a second order tensor of type (2,0) (e.g., $\sigma = \mathcal{O}_2^0$). The Cauchy stress tensor obeys the tensor transformation law under a change in a system of coordinates.

The metric tensor 360 is a function (g) that takes vectors as arguments and provides a scaler in return. More specifically, a metric tensor is a type of function defined on a manifold (such as a surface in space) that takes a pair of tangent vectors as arguments and provides a real number (i.e., a scaler). The metric tensor 360 generalizes many of the familiar properties of the dot product of vectors in Euclidean space. In the same way as a dot product, metric tensors can be used to define length of, and angle between, tangent vectors. FIG. 3 also shows the Christoffel symbol of the second kind, which represents an affine connection: a geometrical object on a smooth manifold which connects nearby tangent spaces, and so permits tangent vector fields to be differentiated as if they were functions on the manifold with values in a fixed vector space. As shown in FIG. 3, the Christoffel symbol depends only on the metric tensor (g) and its derivatives.

Another operation discussed herein is the Lie derivative. The Lie derivative can evaluate change of one vector field along the flow of another vector field. Where the metric tensor is employed, the strain tensor ($\vec{\epsilon}$) is the Lie derivative of the metric tensor field with respect to deformation (e.g., displacement vector field ($\vec{\mu}$)), which can be represented as: $\vec{\epsilon} = L_{\vec{u}}(\vec{g})$.

As described herein, a modeling approach can account for anisotropy, for example, through use of the stiffness tensor (Λ), which express the anisotropic form of Hooke's law in matrix notation. Accordingly, stress may be expressed as: $\vec{\sigma} = \Lambda(\vec{\epsilon})$ However, for purposes of calculation in a finite difference model (or optionally finite element model), iterative with respect to time, stress may be appropriately expressed as follows: $\vec{\sigma} = \Lambda(\vec{\epsilon}) + \vec{g}^* \cdot \omega(i\Delta t)$. In the foregoing equation, $\vec{g}^*$ is the dual of the metric tensor and $\omega(i\Delta t)$ is an external force for iteration "i" and time step $\Delta t$. As described herein, external force may vary over time. In such an example, a method can include calculating the metric tensor and its dual given appropriate boundary conditions.

FIG. 4 shows the tensorial form of the elastic wave equation 410. As described herein, the tensorial form of the elastic wave equation may be solved for displacement where displacement is provided in a manner that accounts for curvilinear variations in displacement. For example, given a regular grid 420 and a conventional Cartesian representation of the elastic wave equation, representation of strain (e.g., displacement) is limited. Specifically, certain phenomena may occur that impact the stress/strain balance where the nature of the Cartesian formulation and grid essentially filter out physically relevant changes. Conventional approaches typically resort to introduction of finer grid spacing, at a greatly increased computation cost. While adaptive grid techniques exist to increase grid density in regions with high gradients, etc., these adaptive techniques tend to be iterative and have significant computational costs.

As described herein, the tensorial form of the elastic wave equation allows for modeling naturally occurring settling or expansion that may occur during reservoir operations (e.g., injection, extraction, extraction and injection, etc.). While the tensorial form introduces additional calculations, the additional calculations can prove worthwhile and provide for understanding of displacements on the level of centimeters even with grid spacing on the order of meters. In essence, the curvilinear space allows for curvature between grid points where the curvature can accurately represent actual physical changes that may occur to a reservoir and surrounding structure (e.g., overburden).

FIG. 4 shows an example where displacements provided by solution of the elastic wave equation in tensorial form can be used to adjust a grid 430. The grid 430 is shown with curvilinear connections between grid points; noting that upon adjustment, an adjusted regular grid may be considered as having linear connections between grid points.

FIG. 5 shows a more detailed formulation of the elastic wave equation as associated with providing a tensorial form of the elastic wave equation 510. Specifically, FIG. 5 shows the stiffness tensor, the gradient force or differential force, an applied, external force, the metric tensor, the dual of the metric tensor, Hooke's law, displacement, strain and the Lie derivative, which is the strain.

FIG. 6 shows an example of implementation of a solution method with respect to time 610. As described herein, equations may be presented in two-dimensions or three-dimensions in space along with time as a dimension. The method 610 includes a provision block 614 that includes providing conditions (e.g., initial conditions, conditions from a prior time step, boundary conditions, etc.). A solution block 618 includes solving a set of equations at a specific point in time. The solution block 618, depending on the nature of the equations (e.g., finite difference, finite element, etc.), may rely on conventional solvers where such solvers can account for the tensorial formulation of the elastic wave equation and its associated conditions. An adjustment block 622 allows for adjustment of a reservoir model based on the solution at the specific time or optionally after a final time has been reached. In other words, the adjustment block 622 may occur only after a number of time steps. The method 610 can then proceed via an iteration block 626 to iterate forward in time. The iteration block 626 may receive one or more new conditions, for example, where a process variable has changed, new data is available that affects a boundary condition, a change has occurred in external force, etc. Further, as mentioned, backwards iteration in time may also be possible where a current or future set of conditions are provided and information about a reservoir sought for a "time" prior to the current or future conditions. For example, given a hypothetical future compaction of a reservoir by a certain amount due to production, what would that reservoir look like today?

FIG. 6 shows an example of a formulation where upon iteration in time from 0 to an integer n−1, the final displacement field is returned. Again, as indicated per block 622, the displacement field may be used to adjust a grid of a model to thereby account for finer scales of strain, which would not be readily observed in a conventional Cartesian formulation and grid approach. The method 610 also shows circuitry or computer-readable medium blocks 616, 620, 624 and 628, which may be physical components configured to perform actions of their corresponding method blocks 614, 618, 622 and 626.

Figure 7:
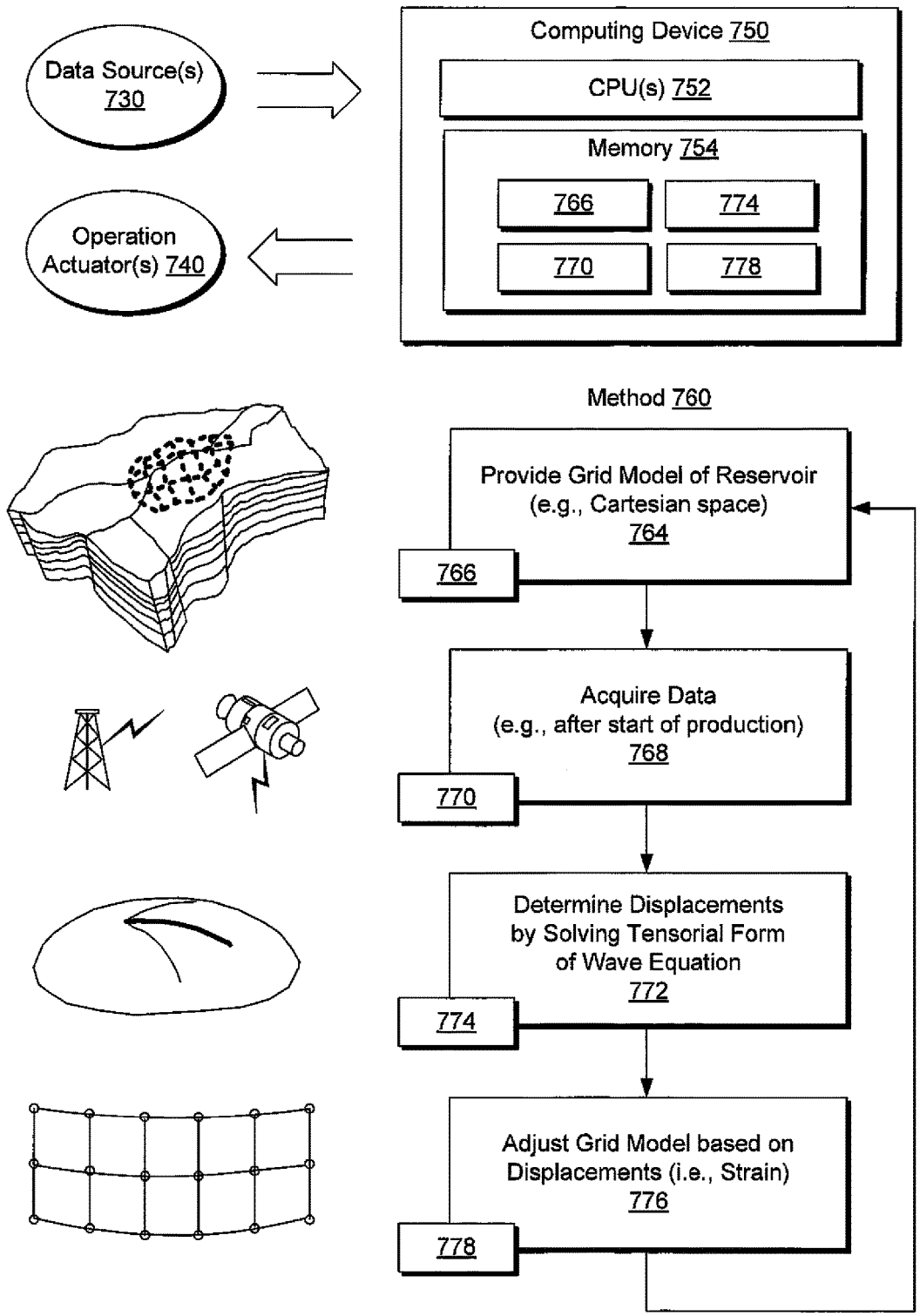
FIG. 7 illustrates an example computing device and method.

FIG. 7 shows an example of a computing device 750 and an associated method 760. The method 760 includes a provision block 764 that provides a grid model of a reservoir. An acquisition block 768 includes acquisition of data, for example, after production commences for the reservoir. A determination or solution block 772 determines displacements by solving a tensorial form of the elastic wave equation. An adjustment block 776 can adjust a grid model based on displacements provided by solution of the tensorial form of the elastic wave equation.

In the example of FIG. 7, the computing device 750 includes one or CPUs 752 and memory 754 with modules 766, 770, 774 and 778, which can include instructions (e.g., of a computer-readable medium) to perform the acts of the blocks 764, 770, 774 and 778 of the method 760, respectively. Further, the computing device 750 can receive information from one or more data sources 730 and output information, for example, to one or more operation actuators 740. Such operation actuators may be valves, pumps, data sensors, etc. Output information may be suitable for rendering to a display or a printer, suitable for digital transmission via one or more networks, etc.

As described herein, one or more computer-readable media can include computer-executable instructions to instruct a computing system to: for a given time, solve the elastic wave equation in tensorial form for a geological reservoir model subject to stated conditions; and adjust a grid associated with the geological reservoir model based on solution of the elastic wave equation in tensorial form for the given time. Such computer-readable media may include instructions to instruct a computing system to adjust a grid based at least in part on strain-related displacements. As described herein, computer-executable instructions may be included to instruct a computing system to issue a notification based at least in part on a solution of the elastic wave equation for the given time (e.g., based on a certain displacement representing compaction and possibly a decrease in production from a reservoir). A notification may be or include an instruction or instructions to adjust an actuator associated with production of material from a reservoir modeled by the geological reservoir model. As described herein, instructions may be included to instruct a computing system to acquire data where the data provides for, at least in part, one or more of the conditions (see, e.g., block 614 of the method 610).

As described herein, one or more computer-readable media may include instructions to instruct a computing system to solve the elastic wave equation in two or more dimensions via a finite difference technique, may include instructions to solve the elastic wave equation in time via a finite difference technique, may include instructions to solve the elastic wave equation represented in part by the metric tensor, may include instructions to provide strain based in part on a Lie derivative, may include instructions to apply information from a curvilinear space to a Cartesian space, may include instructions to associate displacement with one or more operations applicable to a reservoir (e.g., an injection operation, an extraction operation or an injection operation and an extraction operation), etc.

As described herein, a method can include providing a geological reservoir model that includes a Cartesian grid; solving the elastic wave equation in tensorial form for at least a portion of the geological reservoir model subject to certain conditions to provide one or more displacements; and adjusting the Cartesian grid based at least in part on the one or more displacements. Such a method may include acquiring data from one or more sources (e.g., where the data is associated with an actual geological reservoir) and formulating at least one of the conditions based at least in part on the data. A method may include transmitting information to adjust one or more operations associated with an actual geological reservoir, for example, based at least in part on solution of the elastic wave equation in tensorial form. In such an example, the transmitting may transmit information to one or more actuators associated with production of material from the actual geological reservoir.

As described herein, a method may include providing a formulation of the elastic wave equation that accounts for anisotropy in a geological reservoir model.

As described herein, a computing device or computing system can include one or more processors; memory; and circuitry configured to, for a given time, solve the elastic wave equation in tensorial form for a geological reservoir model subject to stated conditions; adjust a grid associated with the geological reservoir model based on solution of the elastic wave equation in tensorial form for the given time; and increment the given time. Noting that such a device may include circuitry configured to decrement the given time.

Figure 8:
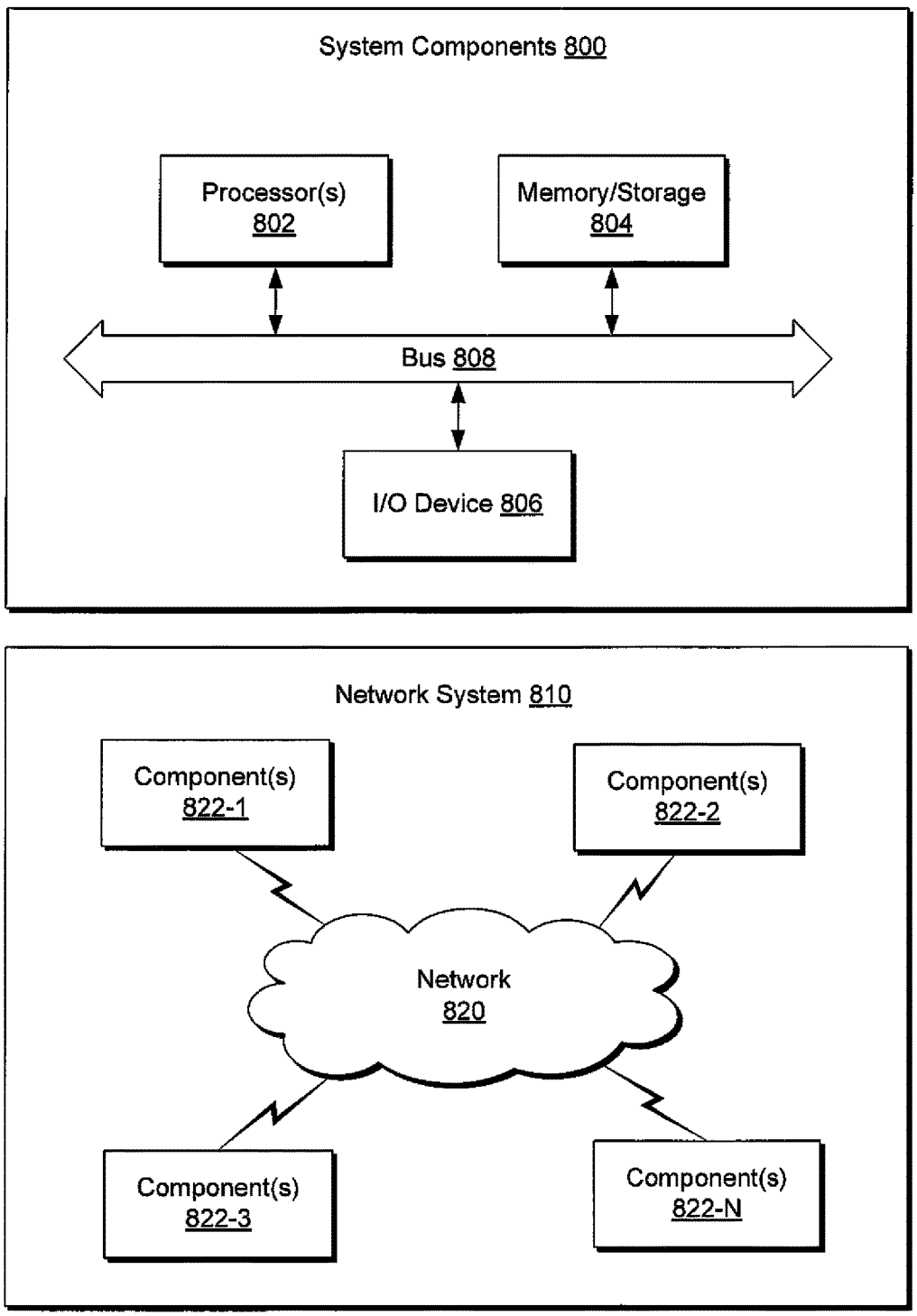
FIG. 8 illustrates example components of a system and a networked system.

FIG. 8 shows components of a computing system 800 and a networked system 810. The system 800 includes one or more processors 802, memory and/or storage components 804, one or more input and/or output devices 806 and a bus 808. As described herein, instructions may be stored in one or more computer-readable media (e.g., memory/storage components 804). Such instructions may be read by one or more processors (e.g., the processor(s) 802) via a communication bus (e.g., the bus 808), which may be wired or wireless. The one or more processors may execute such instructions to implement (wholly or in part) one or more virtual sensors (e.g., as part of a method). A user may view output from and interact with a process via an I/O device (e.g., the device 806).

As described herein, components may be distributed, such as in the network system 810. The network system 810 includes components 822-1, 822-2, 822-3, . . . 822-N. For example, the components 822-1 may include the processor(s) 1002 while the component(s) 822-3 may include memory accessible by the processor(s) 802. Further, the component(s) 802-2 may include an I/O device for display and optionally interaction with a method. The network may be or include the Internet, an intranet, a cellular network, a satellite network, etc.

CONCLUSION

Although various methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

The invention claimed is:

1. One or more computer-readable non-transitory media comprising computer-executable instructions stored therein to instruct a computing system to:
    acquire data of a geological reservoir wherein the data comprise field data captured electronically via one or more data acquisition techniques;
    for a given time, solve the elastic wave equation in tensorial form for a geological reservoir model of the geological reservoir subject to stated conditions to provide a solution that comprises strain-related displacements associated with resource production from the geological reservoir wherein the data provide for, at least in part, one or more of the stated conditions and;
    adjust a grid associated with the geological reservoir model based at least in part on the strain-related displacements, wherein the adjusted grid represents changes in the geological reservoir; and
    issue an instruction to adjust an actuator associated with an operation performed on the geological reservoir based at least in part on the represented changes in the geological reservoir.

2. The one or more computer-readable non-transitory media of claim 1 wherein the instructions to instruct a computing system to solve comprise instructions to solve the elastic wave equation in two or more dimensions via a finite difference technique.

3. The one or more computer-readable non-transitory media of claim 1 wherein the instructions to instruct a computing system to solve comprise instructions to solve the elastic wave equation in time via a finite difference technique.

4. The one or more computer-readable non-transitory media of claim 1 wherein the computer-executable instructions stored therein to instruct a computing system to solve comprise instructions to solve the elastic wave equation represented in part by the metric tensor.

5. The one or more computer-readable non-transitory media of claim 1 wherein the computer-executable instructions stored therein to instruct a computing system to solve comprise instructions to provide strain information based in part on a Lie derivative.

6. The one or more computer-readable non-transitory media of claim 1 further comprising computer-executable instructions stored therein to instruct a computing system to apply information from a curvilinear space to a Cartesian space.

7. The one or more computer-readable non-transitory media of claim 1 further comprising computer-executable instructions stored therein to instruct a computing system to associate the strain-related displacements with one or more operations applicable to a reservoir.

8. The one or more computer-readable non-transitory media of claim 7 wherein the one or more operations applicable to a reservoir comprise an injection operation, an extraction operation or an injection operation and an extraction operation.

9. The one or more computer-readable non-transitory media of claim 1 wherein the strain-related displacements are associated with resource production from the geological reservoir and comprise strain-related displacements associated with an injection operation, an extraction operation or an injection operation and an extraction operation.

10. A method comprising:
    via a computing system, acquiring data of a geological reservoir wherein the data comprise field data captured electronically via one or more data acquisition techniques;
    providing a geological reservoir model of the geological reservoir that comprises a Cartesian grid;
    via the computing system, solving the elastic wave equation in tensorial form for at least a portion of the geological reservoir model subject to certain conditions using a computing device to provide displacements wherein the data provide for, at least in part, one or more of the certain conditions;
    via the computing system, adjusting the Cartesian grid based at least in part on the one or more displacements, wherein the adjusted Cartesian grid represents changes in the geological reservoir; and
    via the computing system, issuing an instruction to adjust an actuator associated with an operation performed on the geological reservoir based at least in part on the represented changes in the geological reservoir.

11. The method of claim 10 wherein the issuing transmits information to one or more actuators associated with production of material from the actual geological reservoir.

12. The method of claim 10 wherein the elastic wave equation accounts for anisotropy in the geological reservoir model.

13. The method of claim 10 further comprising repeating the solving for different times.

14. A computing device comprising:
    one or more processors;
    memory operatively coupled to the one or more processors; and
    processor-executable instructions stored in the memory and executable to instruct the system to
        acquire data of a geological reservoir wherein the data comprise field data captured electronically via one or more data acquisition techniques;
        for a given time, to provide a solution, solve the elastic wave equation in tensorial form for a geological reservoir model of the geological reservoir subject to stated conditions wherein the data provide for, at least in part, one or more of the stated conditions;
        adjust a grid associated with the geological reservoir model based on the solution of the elastic wave equation in tensorial form for the given time, wherein the adjusted grid represents changes in the geological reservoir;
        issue an instruction to adjust an actuator associated with an operation performed on the geological reservoir based at least in part on the represented changes in the geological reservoir.

15. The computing device of claim 14 wherein the processor-executable instructions comprise instructions to increment and/or to decrement the given time.

* * * * *